Oct. 21, 1924.
A. S. DONDERO ET AL
SOLDERING DEVICE
Filed Dec. 1, 1921
1,512,459
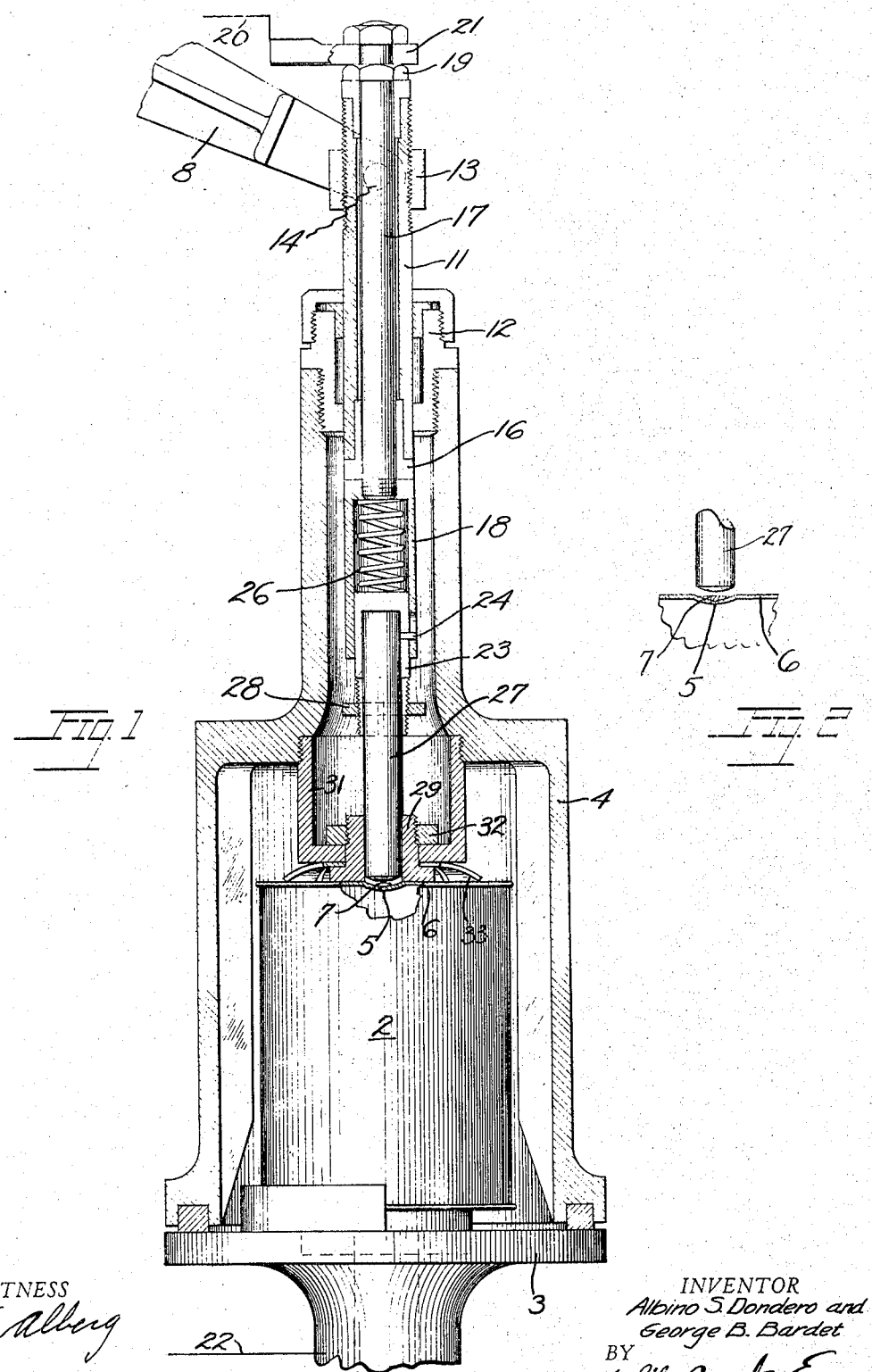
WITNESS
A. E. Alberg
INVENTOR
Albino S. Dondero and
George B. Bardet
BY
White Prost & Evans
Their ATTORNEYS Patented Oct. 21, 1924.

1,512,459

UNITED STATES PATENT OFFICE.

ALBINO S. DONDERO, OF OAKLAND, AND GEORGE A. BARDET, OF BERKELEY, CALIFORNIA.

SOLDERING DEVICE.

Application filed December 1, 1921. Serial No. 519,101.

*To all whom it may concern:*

Be it known that we, ALBINO S. DONDERO and GEORGE A. BARDET, citizens of the United States of America, and residents, respectively, of Oakland and Berkeley, both in the county of Alameda and State of California, have invented a new and useful Soldering Device, of which the following is a specification.

Our invention relates to a device for fusing solder and especially to can-tipping devices.

One of the objects of our invention is the provision of means for fusing solder without the use of a heated "iron." Another object of the invention is the provision of means for fusing the solder by means of the heat generated by the passage therethru of a current of electricity. Another object of the invention is the provision of improved soldering means for use in our vacuum sealing machine which is the subject of our copending application Serial Number 474,239.

Our invention possesses other objects and features of advantage, some of which, with the foregoing, will be set forth in the following description of our invention. It is to be understood that we do not limit ourselves to the showing made by the said description, as we may adopt variant forms of our invention as set forth in the claims.

Referring to the drawings, Fig. 1 is a vertical sectional view thru our soldering device. A portion of the mechanism of our vacuum sealing machine above referred to is shown in connection with the soldering device to make its use clear. Fig. 2 is a detail in vertical section showing how the circuit is broken by the melting of the solder.

In accordance with our invention described in the copending application referred to we position a vented can 2 upon an operating table 3, and by appropriate means raise the table to place the can within the vacuum head 4 from which the air is exhausted by suitable means, thus also vacuumizing the can. The vent 5 is formed at the bottom of a shallow depression in the head 6 of the can and before the can is introduced upon the table 3 a small portion of flexed solder 7 is placed in the depressed portion over or closely adjacent the vent. Immediately following the vacuumization of the can, the soldering or tipping mechanism is depressed into contact with the solder to fuse it over the vent, by means of the lever 8 operated by suitable mechanism working in time with the other instrumentalities of the machine.

Broadly considered our present invention comprises means for closing an electric circuit thru the piece of solder. The heat generated by the passage of the current thru the solder causes it to fuse and run over the vent. In fusing, the solder drops away from the contact thus breaking the circuit. The contact point is not formed of copper and is not an "iron" in accordance with the usual usage of that term, but is a piece of carbon which remains relatively cool. Means are also provided for resiliency mounting the carbon terminal so that the inequalities in the solder or can are compensated, and means are also provided for grounding the can thru the supporting table.

More particularly the subject of our invention comprises a tube 11 slidably mounted in the packing box 12 arranged in the upper portion of the vacuum head 4. The tube is threaded at its upper end thru the block 13, and trunnions 14 on the block provide means for pivotally connecting the tube to the operating arm 8. At both upper and lower ends of the tube are arranged insulating bushings 16 for mounting the conductor rod 17. At its lower end the conductor rod is threaded into the sleeve 18 and a nut 19 at the upper end firmly seats the shoulder formed by the sleeve against the lower bushing 16. The current used is preferably of low voltage and high amperage. A current volume of 400 to 500 amperes at a pressure of 5 to 10 volts will be found satisfactory. One side 20 of the electric circuit is fixed by nut 21 to the conductor rod. The other side 22 of the circuit is connected into the base of the machine with which the table 3 is electrically connected. Slidably arranged in the sleeve 18 is a chuck 23, and a pin 24 fixed in the chuck and engaging a slot in the sleeve limits movement of the chuck in the sleeve. A spring 26 resiliently presses the chuck to the lowermost position as shown in Fig. 1. The lower end of the chuck is slotted and the lower outside surface is slightly conical in form and provided with threads so that the lower end may be compressed upon the carbon terminal 27 by the nut 28. The terminal 27 is formed preferably of brush carbon and is preferably rounded at the lower or contact end as shown in Fig. 1.

A support for the lower end of the carbon is provided by the bushing 29 suitably supported on the vacuum head wall. Such support may be provided as shown in our co-pending application or as shown in the instant application by a cup 31 threaded into the top wall of the vacuum head. The bushing 29 is formed of insulating material and secured in the supporting member by the lock nut 32.

Since some of the cans to be sealed come to the vacuum sealing machine partially lacquered, means are provided for insuring the grounding of the can upon its support. With an unlacquered can the contact between the can bottom and the table is sufficient, but with a lacquered can I prefer to provide additional means which grounds the can thru its top. This means comprises spring arms 33 radiating from a central disk which is apertured to slip over the bushing 29 before it is inserted in the cup. With the tightening up of the lock nut 32 the spring arms are secured between the bushing and the cup, and their ends resiliently engage the top of the can when the can is raised to position in the vacuum head.

*Operation.*—The sleeve 11 and connected parts including the carbon terminal are slightly above the position shown in Fig. 1 when the can is introduced into the vacuum head. Immediately following the vacuumizing of the chamber within the vacuum head 4 and the resultant vacuumizing of the can the arm 8 is depressed to lower the terminal 27 into the position shown in Fig. 1. The circuit 20—22 is closed thru the solder piece 7 the instant the terminal touches the solder and the low voltage high amperage current, passing thru the solder, almost instantly fuses it so that it flows out over the vent 6, as shown in Fig. 2, thus breaking the contact with the terminal and opening the circuit. An instant later the carbon terminal is raised. The automatic breaking of the circuit by the melting of the solder is highly important since it prevents overheating of the solder and adjacent parts. If the solder is heated too long or to too high a degree it tends to run thru the vent instead of seal it, but with the breaking of the circuit by the fusion of the solder it flows over the vent and almost immediately cools. Thus the exact amount of heat required to fuse the solder is supplied. I find that with this method of tipping the can, much less flux is required and a far neater job is performed. Owing to the fact that the carbon terminal is not overheated it is very durable and requires to be dressed at its contact only at long intervals. At the present time we are using our device in tipping thousands of cans daily and we find that the percentage of cans faultily sealed is negligible.

We claim:

1. An electrical device for fusing a lump of solder, comprising a terminal, a circuit connected on one side to said solder and on the other side to said terminal, means for moving said terminal toward and from the solder, and adjustable means for limiting the movement of the terminal toward the solder.

2. An electrical device for fusing a lump of solder, comprising a terminal, a circuit connected on one side to said solder and on the other side to said terminal, means for resiliently pressing said terminal against said solder, and adjustable means for limiting the maximum amount of movement of said terminal toward said solder.

3. An electrical device for fusing a lump of solder over the vent in a vacuumized can comprising a terminal, a circuit connected on one side to said terminal and on the other side to said can, a rod upon which said terminal is mounted, and a lever operating in time with the can vacuumizing means for depressing said rod to engage the terminal with said solder lump.

4. An electrical device for fusing a lump of solder over the vent in a vacuumized can comprising a terminal, a circuit connected on one side to said terminal and on the other side to said can, a rod upon which said terminal is mounted for limited longitudinal movement, a spring interposed between said rod and terminal to resiliently extend said terminal from said rod, and means for reciprocating the rod to engage the terminal with said solder lump.

5. A device for electrically fusing a lump of solder over an aperture comprising means for supporting the apertured article, an electric circuit connected on one side to said supporting means, means for grounding the article on said supporting means, a rod arranged adjacent said supporting means, a terminal connected to the other side of said circuit and arranged on said rod, and means for moving said rod to place said terminal in such position that it engages the solid lump of solder but is spaced from the solder when it fuses.

6. A device for fusing a lump of solder comprising means for supporting the article on which the solder is to be fused, an electric circuit connected on one side to said supporting means, means for grounding the article on said supporting means, a spring-pressed terminal connected to the other side of said circuit, and means for moving said terminal into engagement with the solder lump on said article and momentarily maintaining it in such position that the solder will disengage it when fused.

7. An electrical device for fusing a lump of solder over the vent in a vacuumized can comprising a terminal, a circuit connected on one side to said terminal and on the other side to said can, a rod upon which said terminal is mounted for limited longitudinal movement, a spring interposed between said rod and terminal to resiliently extend said terminal from said rod, a lever for reciprocating the rod to engage the terminal with said solder lump, and means for adjusting the rod to vary the shortest distance between the terminal and the can.

In testimony whereof, we have hereunto set our hands.

ALBINO S. DONDERO.
GEORGE A. BARDET.